(12) United States Patent
Miksic et al.

(10) Patent No.: US 7,241,391 B1
(45) Date of Patent: Jul. 10, 2007

(54) BIODEGRADABLE SCALE AND CORROSION INHIBITOR COMPOSITION

(75) Inventors: Boris A. Miksic, North Oaks, MN (US); Alla Furman, Shoreview, MN (US); Margarita Kharshan, Little Canada, MN (US); Ashish Gandhi, St. Paul, MN (US); Gregory M. Hocking, St. Paul, MN (US)

(73) Assignee: Cortec Corporation, St. Paul, MN (US)

( * ) Notice: Subject to any disclaimer, the term of this patent is extended or adjusted under 35 U.S.C. 154(b) by 631 days.

(21) Appl. No.: 10/843,764

(22) Filed: May 12, 2004

(51) Int. Cl.
*C02F 1/00* (2006.01)
*C02F 5/10* (2006.01)
*B65D 85/808* (2006.01)
*C09K 15/06* (2006.01)
*C09K 15/20* (2006.01)

(52) U.S. Cl. .............. 210/749; 252/184; 252/398; 252/399; 252/405; 252/407; 252/180; 206/524.4; 206/524.7; 210/765

(58) Field of Classification Search .............. 252/180
See application file for complete search history.

(56) References Cited

U.S. PATENT DOCUMENTS

| | | | |
|---|---|---|---|
| 2,511,782 A * | 6/1950 | Newman ............ 106/146.1 |
| 2,744,624 A | 5/1956 | Hoogstoel et al. ............ 206/65 |
| 3,018,015 A | 1/1962 | Agriss et al. ............ 428/180 |
| 3,142,599 A | 7/1964 | Chavannes ............ 156/210 |
| 3,231,454 A | 1/1966 | Williams ............ 161/110 |
| 3,483,033 A * | 12/1969 | Casey ............ 127/61 |
| 3,769,145 A | 10/1973 | Gresham et al. ............ 161/68 |
| 4,017,351 A | 4/1977 | Larson et al. ............ 156/494 |
| 4,049,854 A | 9/1977 | Casey et al. ............ 428/72 |
| 4,230,502 A * | 10/1980 | Lustig et al. ............ 106/823 |
| 4,344,536 A | 8/1982 | Oberhuber ............ 206/594 |
| 4,680,125 A * | 7/1987 | Cuisia et al. ............ 210/697 |
| 4,992,259 A * | 2/1991 | Schiraldi et al. ............ 424/49 |
| 5,292,525 A * | 3/1994 | Brenden et al. ............ 424/601 |
| 6,028,160 A | 2/2000 | Chandler et al. ............ 528/176 |
| 6,085,905 A * | 7/2000 | Miksic et al. ............ 206/524.4 |
| 6,126,832 A * | 10/2000 | Stone ............ 210/647 |
| 6,617,415 B1 | 9/2003 | Miksic et al. ............ 528/190 |
| 2004/0082490 A1* | 4/2004 | Arai et al. ............ 510/276 |

FOREIGN PATENT DOCUMENTS

| | | |
|---|---|---|
| DE | 2318582 | 11/1974 |
| GB | 914489 | 1/1963 |
| GB | 1548865 | 7/1979 |
| JP | 10-204408 A * | 4/1998 |
| JP | 2000-217547 A * | 8/2000 |
| JP | 2000-132414 A * | 11/2001 |

* cited by examiner

*Primary Examiner*—Joseph D. Anthony
(74) *Attorney, Agent, or Firm*—Haugen Law Firm PLLP

(57) ABSTRACT

A biodegradable scale and corrosion inhibiting composition includes between about 50 and about 90% by weight of a protein polymer that is derived from a natural source, and between about 10 and about 20% by weight of the alkali salts of gluconic acid.

5 Claims, No Drawings

BIODEGRADABLE SCALE AND CORROSION INHIBITOR COMPOSITION

FIELD OF THE INVENTION

The present invention relates to scale and corrosion inhibiting materials generally, and more particularly to compositions having water soluble and biodegradable ingredients extracted from natural sources for preventing scale build-up, as well as ingredients for preventing corrosion on metallic surfaces exposed to corrosive environments, such as in open-loop, re-circulating water cooling systems.

BACKGROUND OF THE INVENTION

Anti-scalant additives have been commonly utilized in water-based systems where scale build-up on water-contacting surfaces is undesired. Examples of such systems include re-circulating water cooling systems, water treatment facilities, and other applications that utilize controlled water circulation for various purposes. In embodiments such as re-circulating cooling systems, scale deposits on the water-contacting surfaces thereof can build up over time, thereby reducing the effectiveness of coolant water flow through the system. Manual maintenance of such systems to remove scale build-up is both time-consuming and expensive to system operators.

In order to assist in minimizing the formation of such scale deposits, anti-scale additives have been incorporated into the controlled water body of water based systems such as re-circulating water cooling systems. Such commonly utilized anti-scale additives include, for example, phosphonates, polyacrylates, and polyaspartic acid. The anti-scale chemicals identified above, as well as other commonly utilized anti-scale chemicals, have proven to be relatively effective in preventing the formation of scale deposits on water-contacting surfaces of the associated water systems. However, increasing pressure by governmental regulatory administrations has resulted in the promulgation of stricter water quality controls, which have correspondingly resulted in the restricted use of certain chemicals in water supplies that may ultimately be released into the environment. In addition, it has become an effective business strategy to market materials that are environmentally friendly, and which do not have permanent negative impacts on the environment.

Moreover, systems incorporating controlled water bodies such as re-circulating cooling systems face the additional issue of corrosion in water-contacting surfaces of such systems. In order to address the corrosion issue, system operators have been forced to utilize corrosion inhibiting additives that are separate and distinct from the scale inhibiting additives described above.

It is therefore a principal object of the present invention to provide a combination anti-scalant and anti-corrosion composition that is biodegradable.

It is a further object of the present invention to provide a composition having an anti-scalant ingredient and one or more corrosion inhibiting agents that are both biodegradable and derived from naturally occurring and renewable resources.

SUMMARY OF THE INVENTION

By means of the present invention, a combination anti-scalant and corrosion inhibiting composition is provided. The composition is preferably biodegradable, and is made up from naturally-occurring components. In particular, the main component of the compositions of the present invention is preferably a low-molecular weight protein polymer that may be derived from oil-producing plants such as soy beans, or from animal proteins such as caseins or protein concentrate. The main component may instead be a biodegradable material derived from sea-weed such as alginic acid. In addition, the compositions of the present invention preferably incorporate biodegradable corrosion inhibiting agents derived from naturally occurring and renewable sources.

In a preferred embodiment of the present invention, the biodegradable scale and corrosion inhibitor composition includes about 80% by weight of a scale inhibitor ingredient that is derived from a natural source selected from a group consisting of soybeans, milk, and sea-weed, and about 20% by weight of a corrosion inhibitor ingredient such as the alkali salts of gluconic acid.

DETAILED DESCRIPTION OF THE PREFERRED EMBODIMENTS

Protein polymers derived from particular plant or animal proteins are incorporated for their respective effectiveness in anti-scalant properties in the compositions of the present invention. Extensive investigation of Pro-Cote® soy polymers produced by DuPont Soy Polymers led to the discovery that, when properly compounded, an effective scale inhibition and corrosion control product is obtained. Other protein polymers are also effective and when compounded show excellent results (Table 1 and 2). Gluconic acid, which is derived from sugar beets, is added as the alkali salt and acts as a corrosion inhibiting and sequestering agent. Other protein polymers such as Casecrete NH-400, a water-soluble casein polymer available from American Casein Company, are effective as are alginic acids obtained from sea-weed and available from Johnson Matthey Company.

The present invention provides a new readily biodegradable system that is a combination of scale and multi-metal corrosion inhibitors. The compositions of the present invention are comprised of non-toxic readily biodegradable ingredients derived from sustainable resources such as soy beans, sugar beets, milk, and seaweed.

A particularly preferred method for dispensing the compositions of present invention when in powder form is described in U.S. Pat. No. 6,085,905, issued to the same assignee as in the present application, and incorporated herein by reference.

The features and characteristics of the present invention may be achieved in compositions prepared in accordance with the following examples:

EXAMPLE 1

A protein polymer, Casecrete NH-400 was used as the main ingredient in the following recipe:

80 grams of Casecrete NH-400 from American Casein Company 3.5 grams of Sodium propionate 13 grams of Sodium gluconate 2.5 grams of Paraben M from Clariant Corporation 1 gram of Paraben P from Clariant Corporation

EXAMPLE 2

A protein polymer, Pro-Cote 5000 was used as the main ingredient in the following recipe:

80 grams of Pro-Cote 5000 from DuPont Soy Polymers 3.5 grams of Sodium Propionate 13 grams of Sodium gluconate 2.5 grams of Paraben M 1 gram of Paraben P

EXAMPLE 3

Alginic Acid extracted from sea-weed was used as the main ingredient in the following recipe.

80 grams of Alginic acid from Johnson Matthey Company 3.5 grams of Sodium propionate 13 grams of Sodium gluconate 2.5 grams of Paraben M 1 gram of Paraben P The above examples represent preferred embodiments of water-soluble and biodegradable compositions having anti-scalant and corrosion inhibiting properties. The anti-scalant components (Casecrete NH-400, Pro-Cote 5000, and Alginic acid) of the compositions act as biodegradable scale inhibitors, while the alkali salt of gluconic acid (sodium gluconate) acts as both a corrosion inhibiting agent and a sequestering agent. The sequestering property of, for example, sodium gluconate clarifies the solutions of the present invention by banding together insoluble substances such as calcium or iron salts and other insoluble complexes. The remaining components listed in Examples 1-3 are incorporated as solution preservatives. Though the compositions of the present invention do not require the presence of solution preservatives, the present invention contemplates the use of a wide variety of preservatives in addition to, or in place of those identified in Examples 1-3.

In general, the protein polymers utilized in the compositions of the present invention are formed from proteins extracted from associated natural sources, such as soy beans and milk. The raw proteins are treated with acids, alkali, or other chemicals under pre-defined conditions so as to obtain protein polymers of desired chain lengths. Alginic acid, in particular, is a polysaccharide that is extracted from sea-weed.

Though certain scale inhibiting ingredients have been identified in Examples 1-3 above, the present invention contemplates the utilization of other biodegradable protein polymers derived from naturally occurring sources. It has been found that the compositions of the present invention are most effective when they incorporate between about 50 and about 90% by weight of the scale inhibiting ingredients, and about 10 to about 20% by weight of the alkali salts of gluconic acid. Accordingly, the recipes identified above are merely exemplary of various useful recipes that may be prepared in accordance with the component concentration ranges described above.

TABLES

The following tables 1 and 2 demonstrate the effectiveness of the compositions of the present invention obtained in accordance with examples 1-3 as described above. The example compositions were compared in tables 1 and 2 to commonly utilized anti-scalant materials. The comparison materials include organo-phosphonate, acrylic polymer, and Baypure DS®, which is a sodium salt of polyaspartic acid that is manufactured by the Bayer Chemical Corporation.

Table 1 demonstrates the ability to suppress the formation of $CaCl_2$ and $CaSO_4$ scale in accordance with the NACE standard TM 0374-2001 Laboratory Screening Tests. This standardized testing method is used to determine the ability of scale inhibitors to prevent the precipitation of calcium sulfate and calcium carbonate from solution. The sample materials were tested in standard brines at a concentration level of 10 ppm.

TABLE 1

| Materials | CaCO3, ppm | % of Scale inhibition* | CaSO4, ppm | % of Scale inhibition* |
|---|---|---|---|---|
| Organo-Phosphosate | 4050 | 95.5 | 3950 | 76.9 |
| Acrylic Polymer | 3100 | 16.7 | 4250 | 92.3 |
| Example 1 | 3550 | 54.2 | 4150 | 87.2 |
| Example 2 | 3100 | 16.7 | 4200 | 89.7 |
| Example 3 | 3100 | 16.7 | 4250 | 92.3 |
| Baypure DS 100/40 | 3000 | 6.6 | 4000 | 79.5 |
| Control (w/o scale inhibitor | 2900 | — | 2450 | — |
| Initial | 4100 | — | 4400 | — |

*% of scale inhibition = (Ca − Cb)/(Cc − Cb)*100. Where Ca = the concentration of Calcium in solution with scale inhibitor; Cc = the initial concentration of Ca in brine; Cc = the concentration of Ca in control sample.

Table 2 demonstrates the corrosion inhibiting properties of the compositions of the present invention prepared in accordance with Examples 1-3 described above compared to the commonly-utilized anti-scalant additives used in Table 1. Half-Immersion corrosion tests were performed to evaluate the effect of anti-scalants on the corrosion of the most common metals found in re-circulating water cooling systems, that being carbon steel, copper, aluminum, and galvanized steel. The tests were carried out at room temperature for 72 hours with the tested compositions being added to tap water at a concentration level of 1000 ppm of the active ingredients. Test panels fabricated from each of the above-identified metal materials were visually inspected after 72 hours of Half-Immersion exposure to the testing solutions.

TABLE 2

| Materials | Carbon Steel | Calvanized | Aluminum | Copper |
|---|---|---|---|---|
| Organo-Phosphosate | Corrosion | Corrosion | Corrosion | Corrosion |
| Acrylic Polymer | Corrosion | Corrosion | Severe Corrosion | Severe Corrosion |
| Example 1 | Very slight Corrosion | Very slight Corrosion | No visible Corrosion | No visible Corrosion |
| Example 2 | No visible Corrosion | No visible Corrosion | No visible Corrosion | No visible Corrosion |
| Example 3 | Slight Corrosion | Slight Corrosion | Slight Corrosion | No visible Corrosion |
| Baypure DS 100/40 (Polyaspartic acid) | Corrosion | Severe Corrosion | Slight Corrosion | Slight Corrosion |
| Control | Corrosion | Corrosion | Corrosion | Corrosion |

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

What is claimed is:

1. A method of dispensing a biodegradable scale and corrosion inhibitor composition into a water-based system comprising:
   a) packaging said biodegradable scale and corrosion inhibitor composition within a container fabricated from a water-soluble film, said biodegradable scale and corrosion inhibitor composition having:
      (i) between about 50 and about 90% by weight of a scale inhibiting substance derived from a natural source, and being selected from the group consisting of soy polymers, casein polymers and alginic acid, and
      (ii) between about 13 and about 20% by weight of alkali salts of gluconic acid; and
   b) depositing said container into said water-based system.

2. A biodegradable scale and corrosion inhibitor composition, comprising:
   a) between about 50 and about 90% by weight of a scale inhibiting substance derived from a natural source, said scale inhibiting substance being selected from the group consisting of soy polymers, casein polymers, and alginic acid; and
   b) between about 13 and about 20% by weight of alkali salts of gluconic acid.

3. A composition as in claim 2, including about 80% by weight of said casein polymer, about 13% by weight of sodium gluconate, about 3.5% by weight of sodium propionate, about 2.5% of Paraben M, and about 1% by weight of Paraben P.

4. A composition as in claim 2, including about 80% by weight of said soy polymer, about 13% by weight of sodium gluconate, about 3.5% by weight of sodium propionate, about 2.5% of Paraben M, and about 1% by weight of Paraben P.

5. A composition as in claim 2, including about 80% by weight of said alginic acid, about 13% by weight of sodium gluconate, about 3.5% by weight of sodium propionate, about 2.5% of Paraben M, and about 1% by weight of Paraben P.

* * * * *